(12) United States Patent
Sarin

(10) Patent No.: US 10,547,531 B2
(45) Date of Patent: *Jan. 28, 2020

(54) SYSTEMS AND METHODS FOR ENFORCING DATA LOSS PREVENTION POLICIES

(71) Applicant: Symantec Corporation, Mountain View, CA (US)

(72) Inventor: Sumit Sarin, Pune (IN)

(73) Assignee: CA, Inc., San Jose, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 15/469,610

(22) Filed: Mar. 27, 2017

(65) Prior Publication Data

US 2018/0278505 A1 Sep. 27, 2018

(51) Int. Cl.
*H04L 29/06* (2006.01)
*H04L 12/26* (2006.01)
(Continued)

(52) U.S. Cl.
CPC .......... *H04L 43/0829* (2013.01); *G06F 21/50* (2013.01); *G06F 21/604* (2013.01);
(Continued)

(58) Field of Classification Search
CPC ........... H04L 43/0829; H04L 29/06095; H04L 63/102; H04L 63/105; H04L 63/20;
(Continued)

(56) References Cited

U.S. PATENT DOCUMENTS

| 8,832,780 | B1 | 9/2014 | Sarin |
| 9,246,944 | B1 | 1/2016 | Chen |

(Continued)

OTHER PUBLICATIONS

Anonymous: "Dependency Walker (depends.exe) Home Page", Mar. 25, 2017 (Mar. 25, 2017), XP055474277, Retrieved from the Internet: URL:https://web.archive.org/web/20170325150725/http://www.dependencywalker.com/.

(Continued)

*Primary Examiner* — Evans Desrosiers
(74) *Attorney, Agent, or Firm* — FisherBroyles, LLP

(57) ABSTRACT

The disclosed computer-implemented method for enforcing data loss prevention policies may include (i) identifying an application installed on the computing device, where the computing device is capable of transmitting data to other computing devices via a wireless technology standard for exchanging data over short distances, (ii) examining the application for a module that indicates that the application is capable of transferring files via the wireless technology standard, (iii) monitoring for initiations of connections via the wireless technology standard by the application, (iv) monitoring, in response to detecting an initiation of a connection via the wireless technology standard by the application, file system access by the application, (v) determining that the application is attempting to open a file, and (vi) analyzing the file to determine if transferring the file via the wireless technology standard violates a data loss prevention policy. Various other methods, systems, and computer-readable media are also disclosed.

15 Claims, 7 Drawing Sheets

(51) Int. Cl.
*G06F 21/60* (2013.01)
*G06F 21/62* (2013.01)
*G06F 21/50* (2013.01)
*H04W 12/02* (2009.01)

(52) U.S. Cl.
CPC ...... *G06F 21/6218* (2013.01); *G06F 21/6245* (2013.01); *H04L 29/06095* (2013.01); *H04L 63/102* (2013.01); *H04L 63/105* (2013.01); *H04L 63/20* (2013.01); *H04W 12/02* (2013.01); *G06F 2221/2113* (2013.01)

(58) Field of Classification Search
CPC ..... H04L 63/101; G06F 21/50; G06F 21/604; G06F 21/6218; G06F 21/6245; G06F 21/552; G06F 2221/2113; G06F 2221/2141; H04W 12/02; H04W 12/08
USPC .......................................................... 726/22
See application file for complete search history.

(56) References Cited

U.S. PATENT DOCUMENTS

| | | | |
|---|---|---|---|
| 2015/0163121 A1* | 6/2015 | Mahaffey | G06F 11/0766 707/687 |
| 2015/0237070 A1 | 8/2015 | Manmohan | |
| 2015/0269386 A1* | 9/2015 | Khetawat | G06F 21/62 726/1 |

OTHER PUBLICATIONS

Wikipedia—Bluetooth; last modified on Mar. 17, 2017; https://en.wikipedia.org/w/index.php?title=Bluetooth&oldid=770712477.

* cited by examiner

SYSTEMS AND METHODS FOR ENFORCING DATA LOSS PREVENTION POLICIES

BACKGROUND

Corporate networks are often filled with sensitive data in the form of confidential emails, company-private documents, personally identifying information, financial information, and more. The sensitive data may be spread across dozens or even hundreds of servers and/or personal computers. Further complicating the problem are the large number of personal computing devices carried by members of an organization, such as smartphones and tablets, that typically should not have access to the organization's sensitive data. Ensuring that sensitive data is kept secure can be very important for both a company's reputation and for its success. As a consequence, many companies have data loss prevention policies to ensure that sensitive data is handled correctly. In some cases, data loss prevention policies may specify that sensitive data should not be transferred from devices belonging to the organization to personal devices belonging to members of the organization.

Traditional systems for ensuring that sensitive data is not transferred to inappropriate devices may be effective for email and/or removable media, but may not be capable of preventing sensitive data from being transferred via wireless protocols. In some cases, wireless protocols may operate in a way that makes it difficult for a data transfer to be stopped once the transfer is initiated. The instant disclosure, therefore, identifies and addresses a need for systems and methods for enforcing data loss prevention policies.

SUMMARY

As will be described in greater detail below, the instant disclosure describes various systems and methods for enforcing data loss prevention policies on computing devices that are capable of transmitting data via a wireless technology standard.

In one example, a computer-implemented method for enforcing data loss prevention policies may include (i) identifying an application installed on the computing device, where the computing device is capable of transmitting data to other computing devices via a wireless technology standard for exchanging data over short distances, (ii) examining the application for a module that indicates that the application is capable of transferring files via the wireless technology standard, (iii) monitoring for initiations of connections via the wireless technology standard by the application in response to detecting the module that indicates that the application is capable of transferring files via the wireless technology standard, (iv) monitoring, in response to detecting an initiation of a connection via the wireless technology standard by the application, file system access by the application while the connection via the wireless technology standard is open, (v) determining, based on monitoring the file system access by the application, that the application is attempting to open a file, and (vi) analyzing the file to determine if transferring the file via the wireless technology standard violates a data loss prevention policy.

In some examples, the computer-implemented method may further include performing a security action in response to determining that transferring the file via the wireless technology standard violates the data loss prevention policy. In some examples, performing the security action may include preventing the application from transferring the file via the wireless technology standard. In some examples, performing the security action may include encrypting the file. In some examples, analyzing the file to determine if transferring the file via the wireless technology standard violates the data loss prevention policy may include analyzing the file to determine if the file includes sensitive data.

In one embodiment, the computer-implemented method may further include (i) identifying an additional application installed on the computing device, (ii) examining the additional application for a module that indicates that the additional application is capable of transferring files via the wireless technology standard, and (iii) determining that the additional application is not subject to monitoring for initiations of connections via the wireless technology standard by the additional application in response to not detecting the module that indicates that the additional application is capable of transferring files via the wireless technology standard. In one embodiment, the module that indicates that the application is capable of transferring files via the wireless technology standard may include a network library. In one embodiment, the module that indicates that the application is capable of transferring files via the wireless technology standard may include a near field communication library.

In some embodiments, detecting the initiation of the connection via the wireless technology standard by the application may include determining an identifier of a computing device to which the application is connected via the wireless technology standard. In some examples, analyzing the file to determine if transferring the file via the wireless technology standard violates the data loss prevention policy may include comparing the identifier of the computing device to which the application is connected with a data loss prevention policy rule that potentially restricts data transfer to the computing device.

In one embodiment, a system for implementing the above-described method may include (i) an identification module, stored in memory, that identifies an application installed on the computing device, where the computing device is capable of transmitting data to other computing devices via a wireless technology standard for exchanging data over short distances, (ii) an examining module, stored in memory, that examines the application for a module that indicates that the application is capable of transferring files via the wireless technology standard, (iii) a monitoring module, stored in memory, that (a) monitors for initiations of connections via the wireless technology standard by the application in response to detecting the module that indicates that the application is capable of transferring files via the wireless technology standard and (b) monitors, in response to detecting an initiation of a connection via the wireless technology standard by the application, file system access by the application while the connection via the wireless technology standard is open, (iv) a determination module, stored in memory, that determines, based on monitoring the file system access by the application, that the application is attempting to open a file, (v) an analysis module, stored in memory, that analyzes the file to determine if transferring the file via the wireless technology standard violates a data loss prevention policy, and (vi) at least one physical processor configured to execute the identification module, the examining module, the monitoring module, the determination module, and the analysis module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an application installed on the computing device, where the computing device is capable of transmitting data to other computing devices via a wireless technology standard for exchanging data over short distances, (ii) examine the application for a module that indicates that the application is capable of transferring files via the wireless technology standard, (iii) monitor for initiations of connections via the wireless technology standard by the application in response to detecting the module that indicates that the application is capable of transferring files via the wireless technology standard, (iv) monitor, in response to detecting an initiation of a connection via the wireless technology standard by the application, file system access by the application while the connection via the wireless technology standard is open, (v) determine, based on monitoring the file system access by the application, that the application is attempting to open a file, and (vi) analyze the file to determine if transferring the file via the wireless technology standard violates a data loss prevention policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
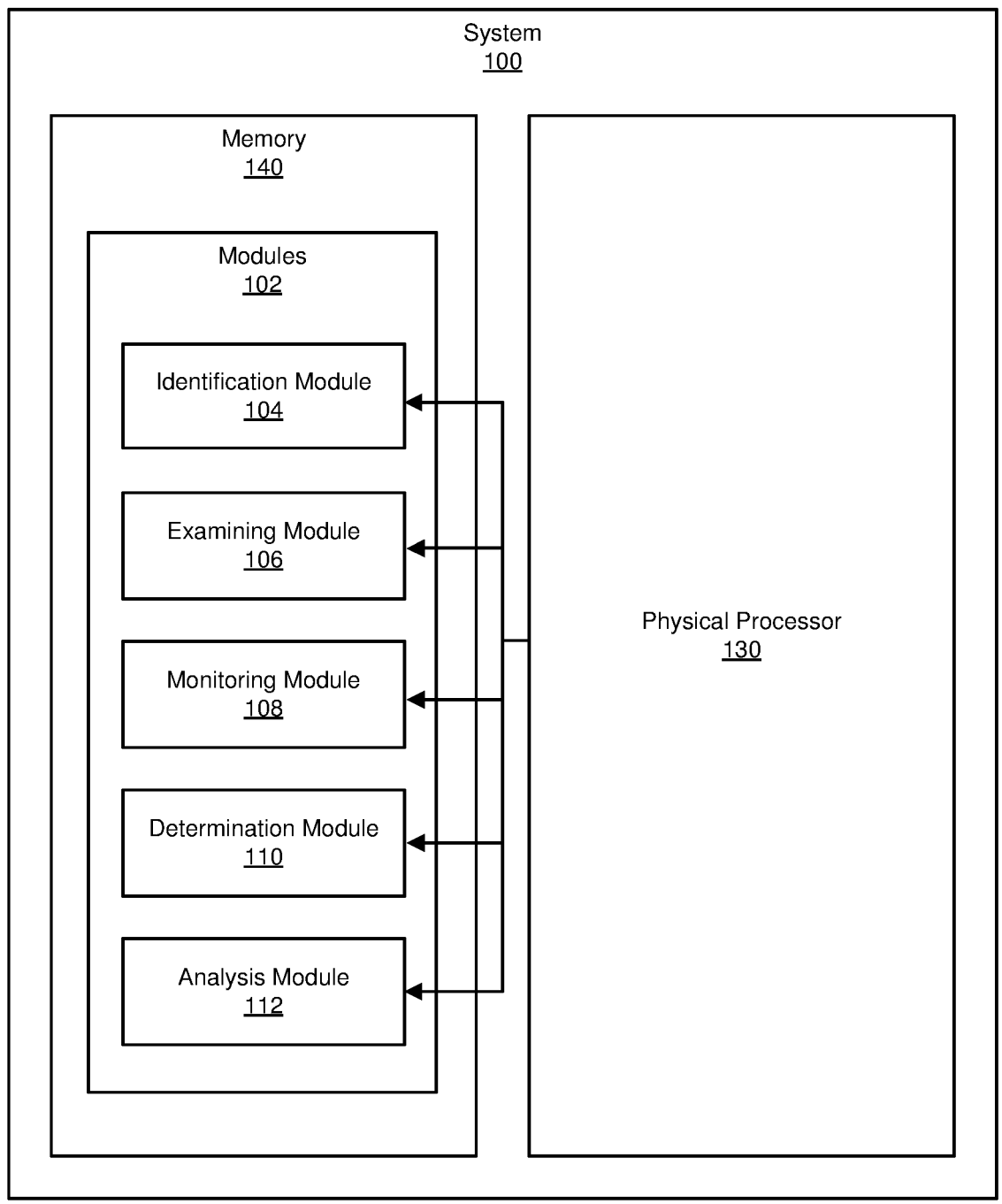
FIG. 1 is a block diagram of an example system for enforcing data loss prevention policies.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for enforcing data loss prevention policies. As will be explained in greater detail below, by monitoring file system access made by devices that are currently connected via wireless technology standards, the systems and methods described herein may be able to prevent the transfer of sensitive data before a file transfer has begun. By preventing file transfers in this way, the systems and methods described herein may be able to improve the effectiveness of data loss prevention policy enforcement mechanisms, thereby reducing an organization's risk of having sensitive data exposed. In addition, the systems and methods described herein may improve the functioning of a computing device by enforcing data loss prevention policies with increased effectiveness and thus reducing the computing device's likelihood of leaking sensitive data. Additionally or alternatively, the systems and methods described herein may improve the functioning of a computing device by allowing legitimate communications (e.g., enabling the use of a wireless communication device generally) while tailoring restrictions on communications to potential violations of data loss prevention policies.

Figure 2:
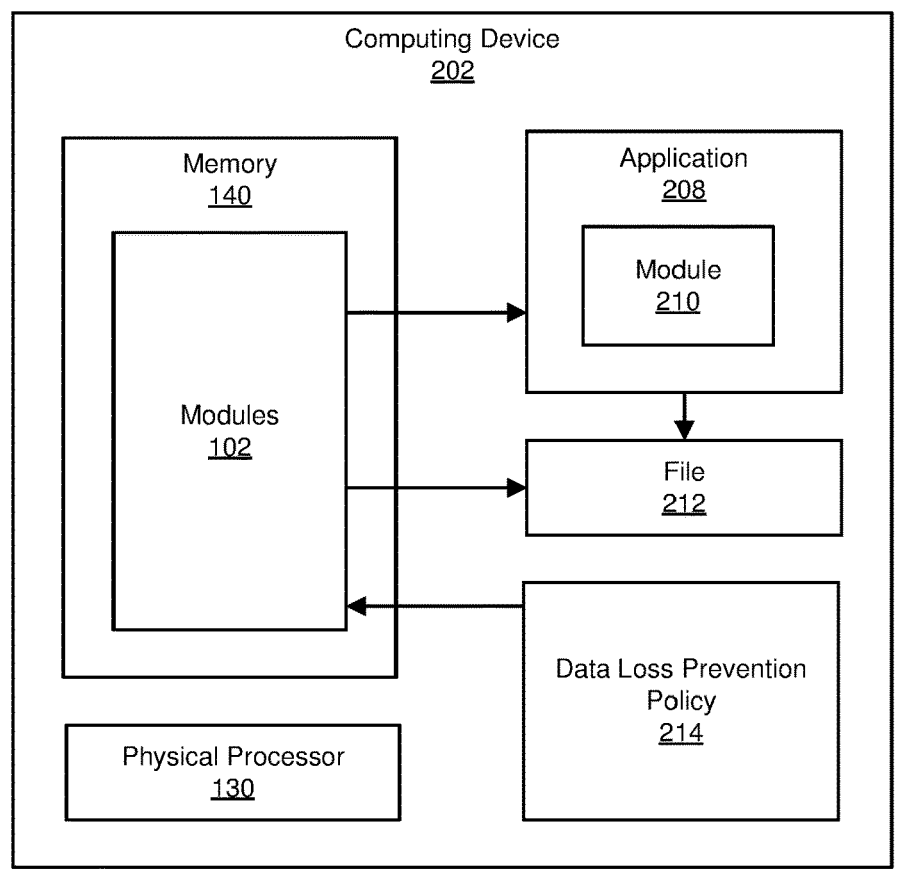
FIG. 2 is a block diagram of an additional example system for enforcing data loss prevention policies.
Figure 3:
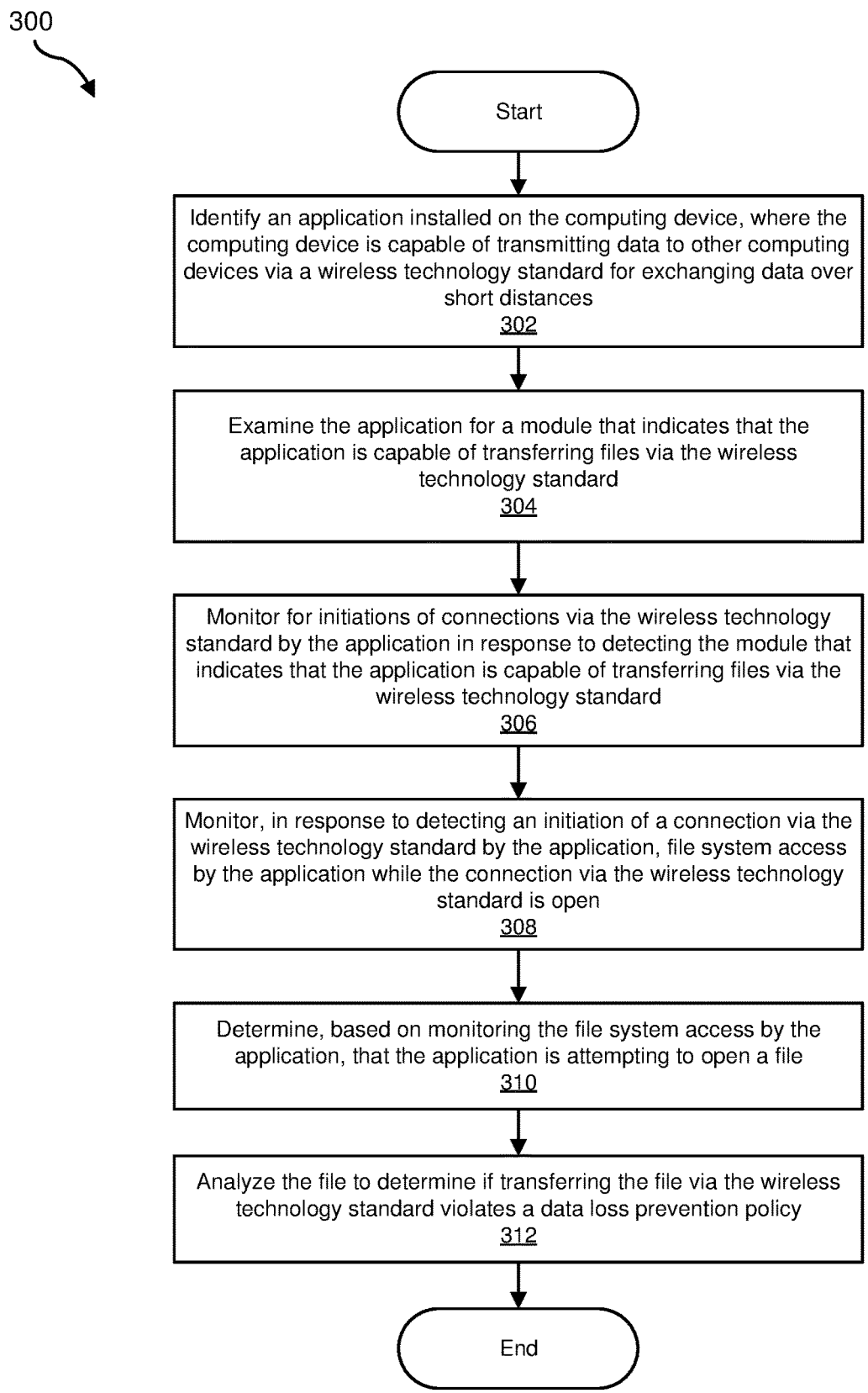
FIG. 3 is a flow diagram of an example method for enforcing data loss prevention policies.
Figure 4:
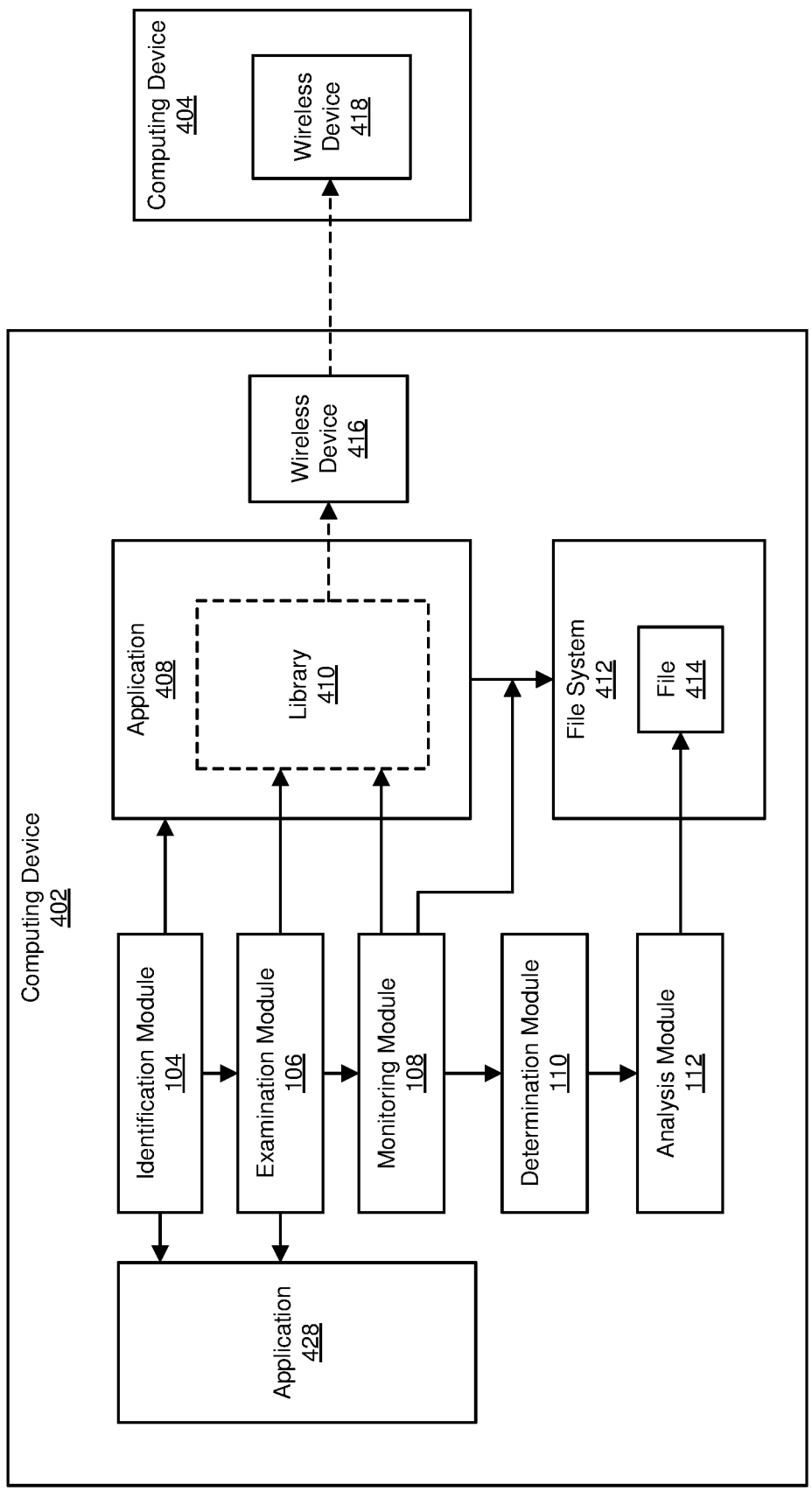
FIG. 4 is a block diagram of an additional example computing system for enforcing data loss prevention policies.
Figure 5:
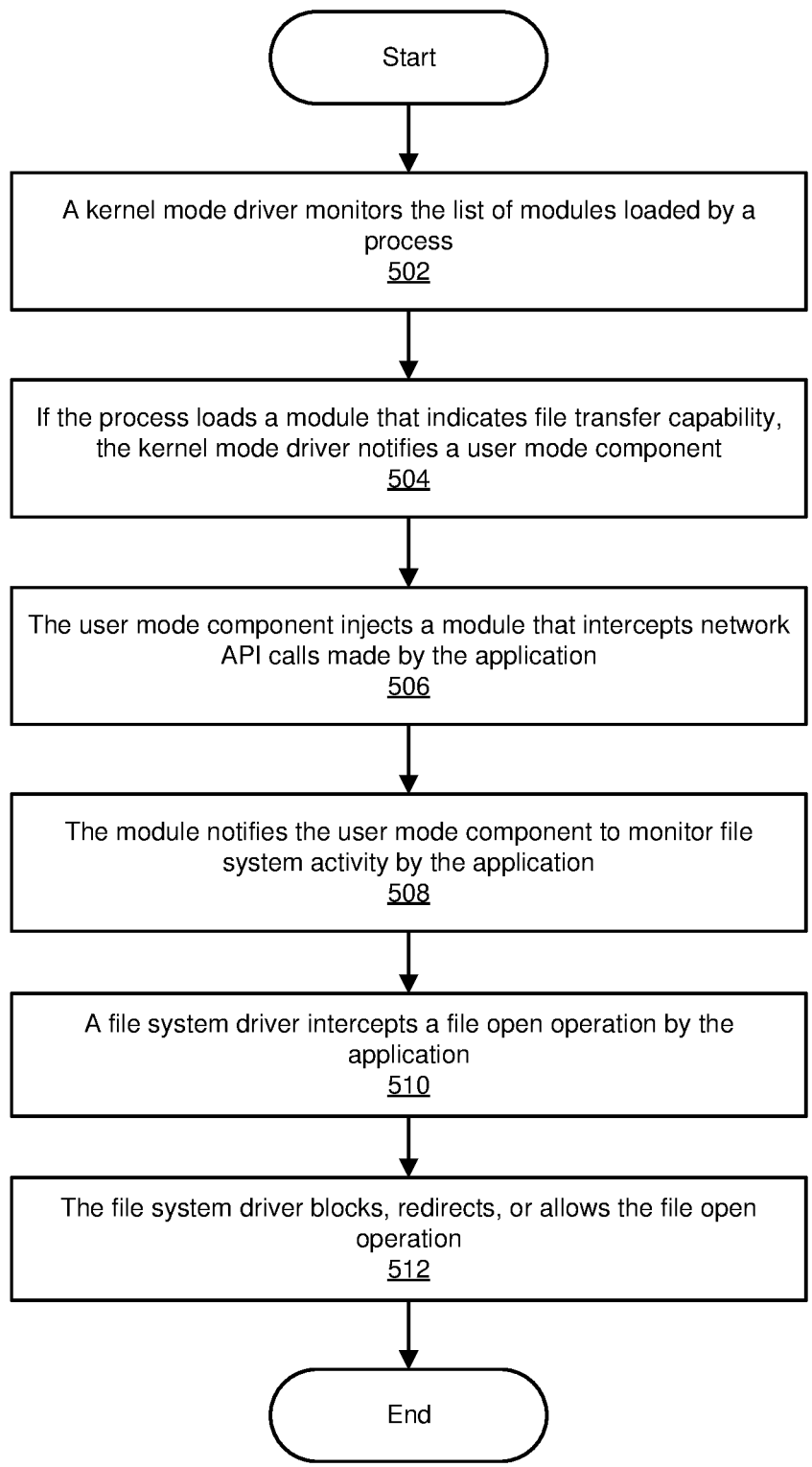
FIG. 5 is a flow diagram of an additional example method for enforcing data loss prevention policies.

The following will provide, with reference to FIGS. 1, 2, and 4, detailed descriptions of example systems for enforcing data loss prevention policies. Detailed descriptions of corresponding computer-implemented methods will also be provided in connection with FIGS. 3 and 5. In addition, detailed descriptions of an example computing system and network architecture capable of implementing one or more of the embodiments described herein will be provided in connection with FIGS. 6 and 7, respectively.

FIG. 1 is a block diagram of example system 100 for enforcing data loss prevention policies. As illustrated in this figure, example system 100 may include one or more modules 102 for performing one or more tasks. For example, and as will be explained in greater detail below, example system 100 may include an identification module 104 that identifies an application installed on the computing device, where the computing device is capable of transmitting data to other computing devices via a wireless technology standard for exchanging data over short distances. Example system 100 may additionally include an examining module 106 that examines the application for a module that indicates that the application is capable of transferring files via the wireless technology standard. Example system 100 may also include a monitoring module 108 that monitors for initiations of connections via the wireless technology standard by the application in response to detecting the module that indicates that the application is capable of transferring files via the wireless technology standard. Monitoring module 108 may also monitor, in response to detecting an initiation of a connection via the wireless technology standard by the application, file system access by the application while the connection via the wireless technology standard is open. Example system 100 may additionally include a determination module 110 that determines, based on monitoring the file system access by the application, that the application is attempting to open a file. Example system 100 may also include an analysis module 112 that analyzes the file to determine if transferring the file via the wireless technology standard violates a data loss prevention policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate enforcing data loss prevention policies. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 enforce data loss prevention policies. For example, and as will be described in greater detail below, identification module 104 may identify an application 208 installed on computing device 202, where computing device 202 is capable of transmitting data to other computing devices via a wireless technology standard for exchanging data over short distances. Next, examining module 106 may examine application 208 for a module 210 that indicates that application 208 is capable of transferring files via the wireless technology standard. Thereafter, monitoring module 108 may monitor for initiations of connections via the wireless technology standard by application 208 in response to detecting module 210 that indicates that application 208 is capable of transferring files via the wireless technology standard. At various occasions, monitoring module 108 may monitor, in response to detecting an initiation of a connection via the wireless technology standard by application 208, a file system access by application 208 while the connection via the wireless technology standard is open. In some instances, determination module 110 may determine, based on monitoring file system access by application 208, that application 208 is attempting to open file 212. In these instances, analysis module 112 may analyze file 212 to determine if transferring file 212 via the wireless technology standard violates a data loss prevention policy 214.

Computing device 202 generally represents any type or form of computing device capable of reading computer-executable instructions. In some embodiments, computing device 202 may be a personal computing device. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Application 208 generally represents any type or form of application capable of transferring files and/or opening files. Module 210 generally represents any type or form of code that enables an application to transfer files via a wireless technology standard. In some examples, module 210 may be include a library. File 212 generally represents any type of data stored on a computing device. In some embodiments, file 212 may be a document file.

FIG. 3 is a flow diagram of an example computer-implemented method 300 for enforcing data loss prevention policies. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify an application installed on the computing device, where the computing device is capable of transmitting data to other computing devices via a wireless technology standard for exchanging data over short distances. For example, identification module 104 may, as part of computing device 202 in FIG. 2, identify application 208 installed on computing device 202, where computing device 202 is capable of transmitting data to other computing devices via a wireless technology standard for exchanging data over short distances.

The term "application," as used herein, generally refers to any file, code, program, script, and/or process that is capable of interacting with data on a computing device. In some embodiments, an application may create data, read data, transform data, delete data, and/or transfer data. In some embodiments, the application may allow a user to select files to transfer to other computing devices via a wireless technology standard. In some examples, the application may include a BLUETOOTH client. In some examples, the application may include a BLUETOOTH server.

The term "wireless technology standard," as used herein, generally refers to any technology standard that allows two or more devices to communicate wirelessly over short distances (e.g., over 100 meters or less, over 30 meters or less, over 10 meters or less, over 20 centimeters or less, etc.). In some embodiments, a wireless technology standard may enable two or more devices to communicate wirelessly without the devices joining a pre-existing network (e.g., the wireless technology standard may enable two or more devices to communicate directly with each other and/or may facilitate the creation of an ad-hoc network that includes the devices). In some examples, a wireless technology standard may be a near field communication (NFC) standard. In another example, a wireless technology standard may be BLUETOOTH.

Identification module 104 may identify the application in a variety of ways and/or contexts. For example, identification module 104 may monitor application installations on the computing device in order to identify new applications. In another embodiment, identification module 104 may periodically scan the computing device in order to identify new applications. In some examples, identification module 104 may be installed on a device that is already configured with one or more applications and may proceed to identify the previously installed applications on the computing device. In some examples, identification module 104 may identify the application by observing that the application loads a library that may be used to implement the wireless technology standard.

At step 304, one or more of the systems described herein may examine the application for a module that indicates that the application is capable of transferring files via the wireless technology standard. For example, examining module 106 may, as part of computing device 202 in FIG. 2, examine application 208 for a module 210 that indicates that application 208 is capable of transferring files via the wireless technology standard.

The term "module," as used herein, generally refers to any code, script, function, subroutine, application, and/or library that enables an application to perform a computing task. In one example, the module that indicates that the application is capable of transferring files via the wireless technology standard may include a network library, such as ws2_32.dll. In another example, the module that indicates that the application is capable of transferring files via the wireless technology standard may include an NFC library. In one example, the module may include a BLUETOOTH library, such as BTHPROPS.dll.

Examining module 106 may identify the module in a variety of ways and/or contexts. For example, examining module 106 may determine that the code of the application contains the module. In another example, examining module 106 may determine that the application makes use of a module that is external to the application but is installed on the computing device. In one embodiment, examining module 106 may include a kernel mode driver that monitors process creation for the application and identifies the list of modules that are statically and/or dynamically loaded by the process. In some embodiments, after examining module 106 identifies the module, examining module 106 may notify a user mode component to inject a module that intercepts application programming interface (API) calls made by the application to the module that indicates that the application is capable of transferring files via the wireless technology standard.

At step 306, one or more of the systems described herein may monitor for initiations of connections via the wireless technology standard by the application in response to detecting the module that indicates that the application is capable of transferring files via the wireless technology standard. For example, monitoring module 108 may, as part of computing device 202 in FIG. 2, monitor for initiations of connections via the wireless technology standard by application 208 in response to detecting module 210 that indicates that application 208 is capable of transferring files via the wireless technology standard.

Monitoring module 108 may monitor the application in a variety of ways. For example, monitoring module 108 may monitor network API calls made by the application. In some embodiments, monitoring module 108 may monitor calls to BLUETOOTH stack APIs made by the application. In other embodiments, monitoring module 108 may monitor calls made to NFC APIs by the application. In some embodiments, monitoring module 108 may determine what protocol the application is using. For example, if the application is using the object exchange (OBEX) protocol and/or the RFCOMM protocol, monitoring module 108 may determine that the application may be about to initiate a BLUETOOTH file transfer. In some embodiments, if monitoring module 108 determines that the application is about to initiate a file transfer, monitoring module 108 may notify a user mode component of the systems described herein to notify a file system driver to monitor file system activity by the application.

In one embodiment, the systems described herein may identify an additional application installed on the computing device, examine the additional application for a module that indicates that the additional application is capable of transferring files via the wireless technology standard, and determine that the additional application is not subject to monitoring for initiations of connections via the wireless technology standard. For example, the systems described herein may identify an additional application that interfaces with a mouse and/or keyboard via BLUETOOTH. In this example, the systems described herein may determine that there is no risk of the application transferring files and therefore the application does not need to be monitored in order to enforce the data loss prevention policy.

At step 308, one or more of the systems described herein may monitor, in response to detecting an initiation of a connection via the wireless technology standard by the application, file system access by the application while the connection via the wireless technology standard is open. For example, monitoring module 108 may, as part of computing device 202 in FIG. 2, monitor, in response to detecting an initiation of a connection via the wireless technology standard by application 208, file 212 system access by application 208 while the connection via the wireless technology standard is open.

Monitoring module 108 may monitor file system access by the application in a variety of ways. For example, monitoring module 108 may include a file system driver that monitors file system access by the application. In some embodiments, monitoring module 108 may only monitor attempts by the application to open and/or read files. In these embodiments, monitoring module 108 may not monitor attempts by the application to delete files or create new files.

At step 310, one or more of the systems described herein may determine, based on monitoring the file system access by the application, that the application is attempting to open a file. For example, determination module 110 may, as part of computing device 202 in FIG. 2, determine, based on monitoring file 212 system access by application 208, that application 208 is attempting to open file 212.

Determination module 110 may determine that the application is attempting to open a file in a variety of ways. For example, determination module 110 may receive a message from a file system driver indicating that the application is attempting to open a file. In some embodiments, determination module 110 may include a file system driver. In one embodiment, determination module 110 may intercept, via a file system driver, the application's attempt to open the file and/or may delay the completion of the application's attempt to open the file until the systems described herein can analyze the file.

At step 312, one or more of the systems described herein may analyze the file to determine if transferring the file via the wireless technology standard violates a data loss prevention policy. For example, analysis module 112 may, as part of computing device 202 in FIG. 2, analyze file 212 to determine if transferring file 212 via the wireless technology standard violates data loss prevention policy 214.

The term "data loss prevention policy," as used herein, generally refers to any set of rules and/or instructions designed to reduce the risk of data loss. For example, an organization may create a data loss prevention policy to prevent sensitive data from being accessible to people outside the organization. A data loss prevention policy may include rules for employees to follow and/or computing instructions, such as scripts and/or applications, that secure computing devices against data loss. For example, a data loss prevention policy may include a rule that sensitive data is not allowed to be copied to external storage devices, sent via email, uploaded to file transfer services, and/or transferred to personal computing devices. In some examples, data loss prevention policies may include rules regulating data at rest (i.e. in storage), data in motion (i.e. traveling over a network), and/or data in use. In one example, a data loss prevention policy may specify that sensitive data may not be transferred using a wireless technology standard.

Analysis module 112 may analyze the file in a variety of ways. In one embodiment, analysis module 112 may be a user mode agent that receives information about the file from a filesystem driver. In some examples, analysis module 112 may compare characteristics of the file to policy rules that specify characteristics of sensitive files. In some examples, analysis module 112 may examine the content, metadata, and/or location of the file to determine whether the file is subject to the data loss prevention policy. In some examples, analysis module 112 may analyze the file to determine if transferring the file via the wireless technology standard violates the data loss prevention policy by analyzing the file to determine if the file includes sensitive data. Examples of sensitive data may include, without limitation, personally identifying information, financial information, confidential information, and/or information protected by regulations. In some embodiments, analysis module 112 may determine that transferring any file via the wireless technology standard violates the data loss prevention policy.

In some examples, analysis module 112 may analyze the device to which the file is likely being transferred in order to determine whether transferring the file would violate the data loss prevention policy. In some embodiments, the systems described herein may detect the initiation of the connection via the wireless technology standard by the application by determining an identifier of a computing device to which the application is connected via the wireless technology standard. For example, the systems described herein may enumerate all the computing devices that are reachable by the computing device via the wireless technology standard and may collect the names and/or addresses of the devices. In one embodiment, the systems described herein may enumerate all the paired BLUETOOTH devices. In some embodiments, the systems described herein may then use information from an intercepted network API call made by the application in order to determine the name of the device to which the application is currently connected and to which the application may be attempting to transfer a file.

In some examples, analysis module 112 may analyze the file to determine if transferring the file via the wireless technology standard violates the data loss prevention policy by comparing the identifier of the computing device to which the application is connected with a data loss prevention policy rule that may potentially restrict data transfer to the computing device. For example, analysis module 112 may determine that the other computing device is also owned by the organization and therefore transferring the file will not violate the data loss prevention policy. In another example, analysis module 112 may determine that the other computing device is unknown and/or is a personal computing device and therefore transferring the file to the other computing device will violate the data loss prevention policy. In some embodiments, analysis module 112 may store a whitelist of known safe devices that may receive files. In other embodiments, analysis module 112 may use heuristics to determine whether a computing device may receive files in accordance with the data loss prevention policy. For example, analysis module 112 may determine that a smartphone is unlikely to be owned by the organization and thus may not receive files.

In some examples, the systems described herein may perform a security action in response to determining that transferring the file via the wireless technology standard violates the data loss prevention policy. In one example, the systems described herein may prevent the application from transferring the file via the wireless technology standard. In one embodiment, the systems described herein may block the application from opening the file, thus preventing the application from transferring the file.

In some examples, the systems described herein may perform the security action by encrypting the file. For example, the systems described herein may create an encrypted copy of the file and may redirect the file open operation on the file to the encrypted copy of the file in order to allow the application to transfer the encrypted copy of the file.

In some embodiments, the systems described herein may perform the security action by creating an incident report including the user, the application, the file, and/or the destination device. In one embodiment, the systems described herein may send the incident report to an administrator. In some examples, the systems described herein may warn the user that the user is about to violate the data loss prevention policy.

In some examples, the systems described herein may determine that transferring the file will not violate the data loss prevention policy. In these examples, the systems described herein may allow the user to transfer the file.

In some examples, the systems described herein may identify and/or perform actions relating to multiple applications on a computing device. For example, as illustrated in FIG. 4, identification module 104 on computing device 402 may identify an application 408. In this example, examination module 106 may examine application 408 and may determine that application 408 loads a library 410. In some examples, library 410 may not be stored within application 408 and/or may be accessed by application 408 via an API. In some embodiments, examination module 106 may determine that library 410 is capable of interacting with a wireless device 416 on computing device 402. Wireless device 416 may be any type of hardware that may enable computing device 402 to use a wireless technology standard such as BLUETOOTH. For example, wireless device 416 may be a BLUETOOTH chip. In some examples, monitoring module 108 may determine that application 408 is making an API call to library 410 in order to open a connection to a computing device 404 that also includes a wireless device 418 that enables computing device 404 to communicate via the wireless technology standard. In some examples, monitoring module 108 may then begin monitoring access to file system 412 by application 408 and may continue monitoring file system access by application 408 until application 408 is no longer connected to any other device via the wireless technology standard. At some point, determination module 110 may determine that application 408 is attempting to open a file 414. In some examples, analysis module 112 may then analyze file 414 and/or computing device 404 to determine whether transferring file 414 to computing device 404 would violate a data loss prevention policy. In some examples, if analysis module 112 determines that transferring file 414 to computing device 404 would violate the data loss prevention policy, the systems described herein may block application 408 from opening file 414, thus preventing application 408 from transferring file 414 via the wireless technology standard.

In one example, identification module 104 may also identify an application 428 on computing device 402. In this example, examination module 106 may examine application 428 and may determine that application 428 does not load library 410. Monitoring module 108 may then determine that application 428 does not need to be monitored and/or that monitoring module 108 may not monitor initiation of connections and/or file system access by application 428.

In some embodiments, the systems described herein may include a combination of user mode components and/or kernel mode components. For example, at step 502 in FIG. 5, a kernel mode driver may monitor the list of modules loaded by a process to determine whether the application represented by the process is capable of transferring files via a wireless technology standard. At step 504, if the process loads a module that indicates file transfer capability, the kernel mode driver may notify a user mode component. At step 506, the user mode component may inject a module that intercepts network API calls made by the application to the module loaded earlier. At step 508, the module may notify the user mode component to monitor file system activity by the application in response to the module intercepting a network API call to open a connection via the wireless transfer protocol. At step 510, a file system driver may intercept a file open operation attempted by the application. At step 512, depending on whether the systems described herein determine that transferring the file would violate a data loss prevention policy, the file system driver may block, redirect, or allow the file open operation.

As explained in connection with method 300 above, the systems and methods described herein may enforce data loss prevention policies by enabling data loss prevention applications to prevent users from transferring sensitive files via wireless technology standards such as BLUETOOTH. By monitoring file system access when BLUETOOTH or similar connections are open, the systems and methods described herein may prevent applications from opening files to be transferred, enabling the systems and methods described herein to prevent applications from transferring files without needing to stop a transfer that is already in progress. Enabling data loss prevention applications to stop file transfer via wireless technology standards before the file transfers begin may enable data loss prevention applications to more efficiently and effectively prevent sensitive files from being transferred, improving organizational security and reducing the risk of data leaks. Additionally, by only monitoring applications that are capable of transferring files via BLUETOOTH or another similar technology, the systems described herein may avoid impeding the execution of BLUETOOTH or other applications that connect to devices for purposes other than file transfer, such as BLUETOOTH mice, keyboards, printers, and/or speakers. The systems and methods described herein may also prevent applications from transferring files via wireless technology standards without requiring configuration of said applications, improving the user experience. By recording incident reports when a user attempts to transfer files via BLUETOOTH or another wireless technology standard, the systems described herein may improve analysts' ability to perform forensic analysis in the wake of a breach and/or potential breach and/or may improve administrators' abilities to enforce data loss prevention policies.

Figure 6:
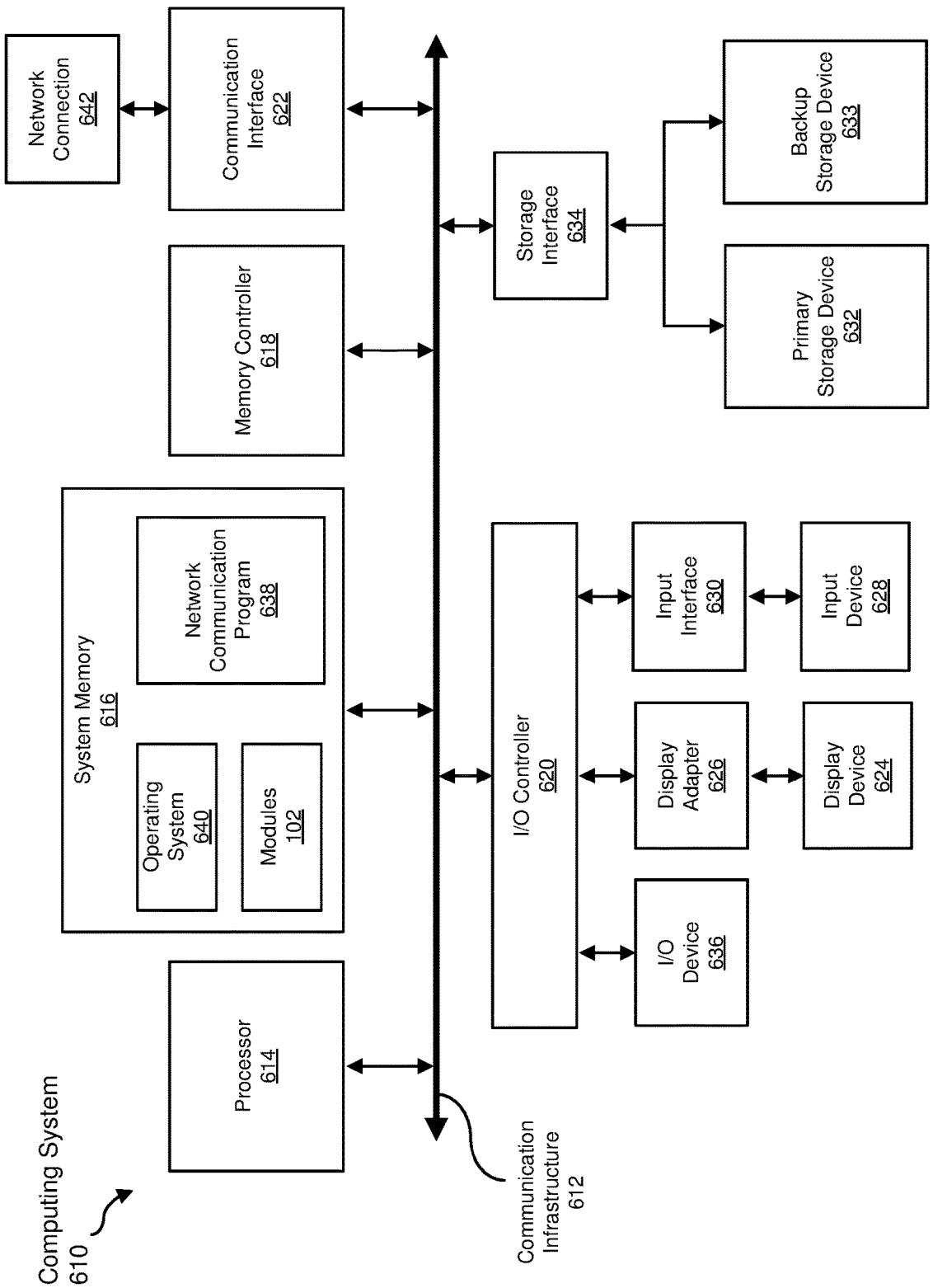
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
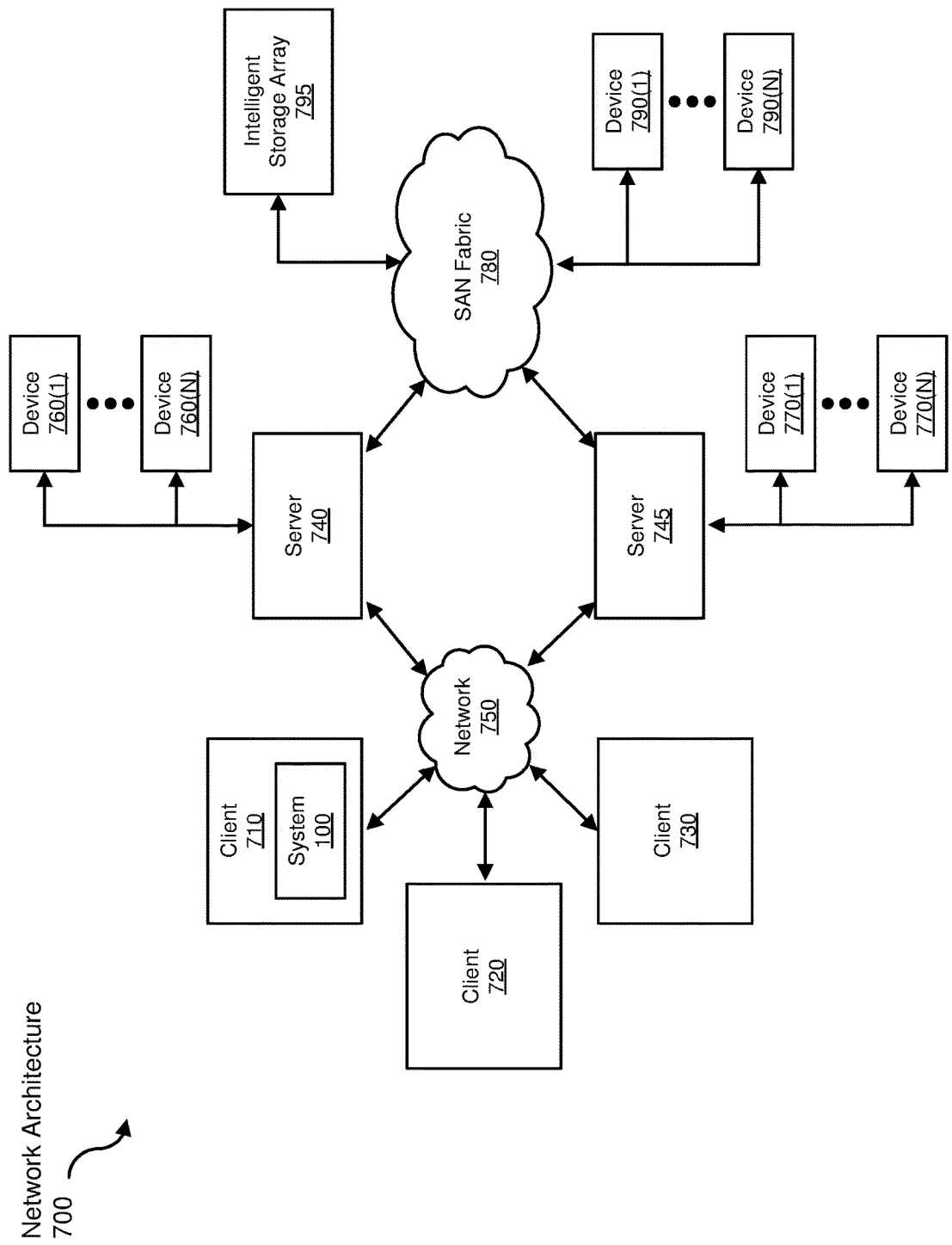
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for enforcing data loss prevention policies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive application data to be transformed, transform the application data by analyzing the application data, output a result of the transformation to a module, use the result of the transformation to make a determination about the application, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing data loss prevention policies, at least a portion of the method being performed by a computing device comprising at least one processor, the method comprising:
   identifying an application installed on the computing device, wherein the computing device is capable of transmitting data to other computing devices via a wireless technology standard for exchanging data over short distances;
   examining the application for a module that indicates that the application is capable of transferring files via the wireless technology standard;
   monitoring for initiations of connections via the wireless technology standard by the application in response to detecting the module that indicates that the application is capable of transferring files via the wireless technology standard;
   monitoring, in response to detecting an initiation of a connection via the wireless technology standard by the application, file system access by the application while the connection via the wireless technology standard is open, wherein detecting the initiation of the connection via the wireless technology standard by the application comprises determining an identifier of a computing device to which the application is connected via the wireless technology standard;
   determining, based on monitoring the file system access by the application, that the application is attempting to open a file; and
   analyzing the file to determine if transferring the file via the wireless technology standard violates a data loss prevention policy comprising comparing the identifier of the computing device to which the application is connected with a data loss prevention policy rule that potentially restricts data transfer to the computing device, thereby allowing legitimate
maintaining restrictions on communications which violate the data loss prevention policy, wherein the module that indicates that the application is capable of transferring files via the wireless technology standard comprises at least one of a near field communication library and a Bluetooth™ communication library.

2. The computer-implemented method of claim 1, further comprising performing a security action in response to determining that transferring the file via the wireless technology standard violates the data loss prevention policy.

3. The computer-implemented method of claim 2, wherein performing the security action comprises preventing the application from transferring the file via the wireless technology standard.

4. The computer-implemented method of claim 2, wherein performing the security action comprises encrypting the file.

5. The computer-implemented method of claim 1, wherein analyzing the file to determine if transferring the file via the wireless technology standard violates the data loss prevention policy comprises analyzing the file to determine if the file comprises sensitive data.

6. The computer-implemented method of claim 1, further comprising:
   identifying an additional application installed on the computing device;
   examining the additional application for a module that indicates that the additional application is capable of transferring files via the wireless technology standard; and
   determining that the additional application is not subject to monitoring for initiations of connections via the wireless technology standard by the additional application in response to not detecting the module that indicates that the additional application is capable of transferring files via the wireless technology standard.

7. The computer-implemented method of claim 1, wherein the module that indicates that the application is capable of transferring files via the wireless technology standard comprises a network library.

8. A system for enforcing data loss prevention policies, the system comprising:
   an identification module, stored in memory; that identifies an application installed on a computing device, wherein the computing device is capable of transmitting data to other computing devices via a wireless technology standard for exchanging data over short distances;
   an examining module, stored in memory, that examines the application for a module that indicates that the application is capable of transferring files via the wireless technology standard; a monitoring module, stored in memory, that;
   monitors for initiations of connections via the wireless technology standard by the application in response to detecting the module that indicates that the application is capable of transferring files via the wireless technology standard; and monitors, in response to detecting an initiation of a connection via the wireless technology standard by the application, file system access by the application while the connection via the wireless technology standard is open, wherein detecting the initiation of the connection via the wireless technology standard by the application comprises determining an identifier of a computing device to which the application is connected via the wireless technology standard;

a determination module, stored in memory, that determines, based on monitoring the file system access by the application, that the application is attempting to open a file;

an analysis module, stored in memory, that analyzes the file to determine if transferring the file via the wireless technology standard violates a data loss prevention policy comprising comparing the identifier of the computing device to which the application is connected with a data loss prevention policy rule that potentially restricts data transfer to the computing device, thereby allowing legitimate communications while maintaining restrictions on communications which violate the data loss prevention policy; and at least one physical processor configured to execute the identification module, the examining module, the monitoring module, the determination module, and the analysis module wherein the module that indicates that the application is capable of transferring files via the wireless technology standard comprises at least one of a near field communication library and a Bluetooth™ communication library.

9. The system of claim 8, wherein the analysis module performs a security action in response to determining that transferring the file via the wireless technology standard violates the data loss prevention policy.

10. The system of claim 9, wherein the analysis module performs the security action by preventing the application from transferring the file via the wireless technology standard.

11. The system of claim 9, wherein the analysis module performs the security action by encrypting the file.

12. The system of claim 8, wherein the analysis module analyzes the file to determine if transferring the file via the wireless technology standard violates the data loss prevention policy by analyzing the file to determine if the file comprises sensitive data.

13. The system of claim 8, wherein:
the identification module identifies an additional application installed on the computing device;
the examining module examines the additional application for a module that indicates that the additional application is capable of transferring files via the wireless technology standard; and
the monitoring module determines that the additional application is not subject to monitoring for initiations of connections via the wireless technology standard by the additional application in response to not detecting the module that indicates that the additional application is capable of transferring files via the wireless technology standard.

14. The system of claim 8, wherein the module that indicates that the application is capable of transferring files via the wireless technology standard comprises a network library.

15. A non-transitory computer-readable medium comprising one or more computer-readable instructions that, when executed by at least one processor of a computing device, cause the computing device to:

identify an application installed on the computing device, wherein the computing device is capable of transmitting data to other computing devices via a wireless technology standard for exchanging data over short distances;

examine the application for a module that indicates that the application is capable of transferring files via the wireless technology standard;

monitor for initiations of connections via the wireless technology standard by the application in response to detecting the module that indicates that the application is capable of transferring files via the wireless technology standard;

monitor, in response to detecting an initiation of a connection via the wireless technology standard by the application; the system access by the application while the connection via the wireless technology standard is open, wherein detecting the initiation of the connection via the wireless technology standard by the application comprises determining an identifier of a computing device to which the application is connected via the wireless technology standard;

determine, based on monitoring the file system access by the application, that the application is attempting to open a file; and analyze the file to determine if transferring the file via the wireless technology standard violates a data loss prevention policy comprising comparing the identifier of the computing device to which the application is connected with a data loss prevention policy rule that potentially restricts data transfer to the computing device, thereby allowing legitimate communications while maintaining restrictions on communications which violate the data loss prevention policy, wherein the module that indicates that the application is capable of transferring files via the wireless technology standard comprises at least one of a near field communication library and a Bluetooth™ communication library.

* * * * *

UNITED STATES PATENT AND TRADEMARK OFFICE
CERTIFICATE OF CORRECTION

PATENT NO. : 10,547,531 B2
APPLICATION NO. : 15/469610
DATED : January 28, 2020
INVENTOR(S) : Sumit Sarin Page 1 of 1

It is certified that error appears in the above-identified patent and that said Letters Patent is hereby corrected as shown below:

In the Claims

In Column 20, Line 53, Claim 8, delete "memory;" and insert -- memory, -- therefor.

In Column 20, Line 62, Claim 8, delete "that;" and insert -- that: -- therefor.

In Column 22, Line 30, Claim 15, delete "application; the system" and insert -- application, file system -- therefor.

Signed and Sealed this
Seventeenth Day of March, 2020

Andrei Iancu
*Director of the United States Patent and Trademark Office*